(12) United States Patent
Oguma (10) Patent No.: US 9,416,785 B2
(45) Date of Patent: Aug. 16, 2016

(54) FAN MOTOR (71) Applicant: Nidec Corporation, Kyoto (JP)

(72) Inventor: Yoshiaki Oguma, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 627 days.

(21) Appl. No.: 13/743,699

(22) Filed: Jan. 17, 2013

(65) Prior Publication Data

US 2013/0236339 A1  Sep. 12, 2013

(30) Foreign Application Priority Data

Mar. 6, 2012  (JP) .................................. 2012-048726

(51) Int. Cl.
*F04D 13/06* (2006.01)
*F04D 25/06* (2006.01)
*H02K 9/04* (2006.01)
*H02K 9/06* (2006.01)

(52) U.S. Cl.
CPC ............ *F04D 13/06* (2013.01); *F04D 25/0646* (2013.01); *H02K 9/04* (2013.01); *H02K 9/06* (2013.01)

(58) Field of Classification Search
CPC ..... F04D 25/06; F04D 25/0646; H02K 7/086; H02K 9/04; H02K 9/06; H02K 5/04; H02K 7/085; H02K 7/08; H02K 5/16; H02K 11/00
USPC .................................................. 310/67 R, 90
See application file for complete search history.

(56) References Cited

U.S. PATENT DOCUMENTS

| 5,350,281 | A | * | 9/1994 | Hagshenas | .................... 417/371 |
| 5,578,883 | A | * | 11/1996 | Sakashita | ............... H02K 7/085 |
| | | | | | 310/216.127 |
| 6,097,129 | A | | 8/2000 | Furtwangler et al. | |
| 6,501,200 | B2 | * | 12/2002 | Engel | ..................... H02K 29/08 |
| | | | | | 310/68 R |
| 7,755,240 | B2 | * | 7/2010 | Yang et al. | ....................... 310/91 |
| 2001/0036416 | A1 | | 11/2001 | Obara | |
| 2001/0048254 | A1 | | 12/2001 | Engel et al. | |
| 2005/0123423 | A1 | * | 6/2005 | Weisser | ................ F04D 29/083 |
| | | | | | 417/423.7 |
| 2006/0043802 | A1 | | 3/2006 | Sugiyama et al. | |
| 2006/0175922 | A1 | | 8/2006 | Masuda et al. | |
| 2008/0175729 | A1 | | 7/2008 | Kato et al. | |
| 2009/0285699 | A1 | | 11/2009 | Muraoka et al. | |
| 2010/0143170 | A1 | * | 6/2010 | Peia | ........................... 417/423.7 |
| 2011/0194955 | A1 | * | 8/2011 | Kudo | ...................... F04D 17/16 |
| | | | | | 417/410.1 |

FOREIGN PATENT DOCUMENTS

| JP | 05-199691 A | 8/1993 |
| JP | 2009-278801 A | 11/2009 |
| WO | 03/075433 A1 | 9/2003 |

OTHER PUBLICATIONS

Machine Translation of JP2009-278801; Inventors: Kamoki et al.; Title "Motor with lead wire"; Date of Publication: Nov. 26, 2009.*

* cited by examiner

*Primary Examiner* — Devon Kramer
*Assistant Examiner* — Lilya Pekarskaya
(74) *Attorney, Agent, or Firm* — Keating & Bennett, LLP (57) ABSTRACT

A fan motor includes a base member including a bottom plate portion, a bearing support portion, and a screw receiving portion. The bottom plate portion extends in directions perpendicular or substantially perpendicular to a central axis below a circuit board. The bearing support portion extends upward from the bottom plate portion and has a cylindrical or substantially cylindrical shape. The screw receiving portion is arranged to project upward from the bottom plate portion on a radially outer side of the bearing support portion. At least a portion of the screw receiving portion is arranged in a hole portion defined in the circuit board.

11 Claims, 5 Drawing Sheets

FAN MOTOR

BACKGROUND OF THE INVENTION

1. Field of the Invention

The present invention relates to a fan motor.

2. Description of the Related Art

Fan motors arranged to rotate impellers to generate air currents are known.

Concerning a known fan motor, a fan including an external-rotor drive motor 103 and blades 50 is described in WO 03/075433, for example. In a structure illustrated in FIG. 10 of WO 03/075433, a circuit board 30 is arranged above a base part 46, and a stator 22 is arranged above the circuit board.

The base part of the fan motor is screwed to a frame of a device. Accordingly, a space is required between the base part and the circuit board to secure a sufficient screwing length of a screw. However, the space between the base part and the circuit board raises the axial position of each of the circuit board and the stator with reference to the base part. This makes it difficult to secure a large air channel near an air inlet of the fan.

SUMMARY OF THE INVENTION

A fan motor according to a preferred embodiment of the present invention includes a stationary portion and a rotating portion supported to be rotatable with respect to the stationary portion. The stationary portion includes an armature arranged to be coaxial with a central axis extending in a vertical direction; a circuit board arranged below the armature; and a base member arranged to support the armature and the circuit board. The rotating portion includes a magnet arranged radially outside the armature, and an impeller arranged to rotate together with the magnet. The base member includes a bottom plate portion arranged to extend in directions perpendicular or substantially perpendicular to the central axis below the circuit board; a cylindrical bearing support portion arranged to extend upward from the bottom plate portion; and a screw receiving portion arranged to project upward from the bottom plate portion on a radially outer side of the bearing support portion. The impeller includes an air inlet defined above the armature. The circuit board includes a hole portion extending therethrough in an axial direction. At least a portion of the screw receiving portion is arranged in the hole portion.

According to the above preferred embodiment of the present invention, a lower surface of the circuit board is arranged at an axial height lower than that of an upper end portion of the screw receiving portion. This contributes to reducing the height of each of the circuit board and the armature while securing a sufficient screwing length of a screw. This in turn contributes to securing a larger air channel near the air inlet of the impeller.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a central axis of a fan motor is referred to by the term "axial direction", "axial", or "axially", that directions perpendicular or substantially perpendicular to the central axis of the fan motor are referred to by the term "radial direction", "radial", or "radially", and that a direction along a circular arc centered on the central axis of the fan motor is referred to by the term "circumferential direction", "circumferential", or "circumferentially". It is also assumed herein that an axial direction is a vertical direction, and that a side on which an armature is arranged with respect to a circuit board is defined as an upper side. The shape of each member or portion and relative positions of different members or portions will be described based on the above assumptions. It should be noted, however, that the above definitions of the vertical direction and the upper side are made simply for the sake of convenience in description, and should not be construed to restrict in any way the orientation of a fan motor according to any preferred embodiment of the present invention when the fan motor is in use.

Figure 1:
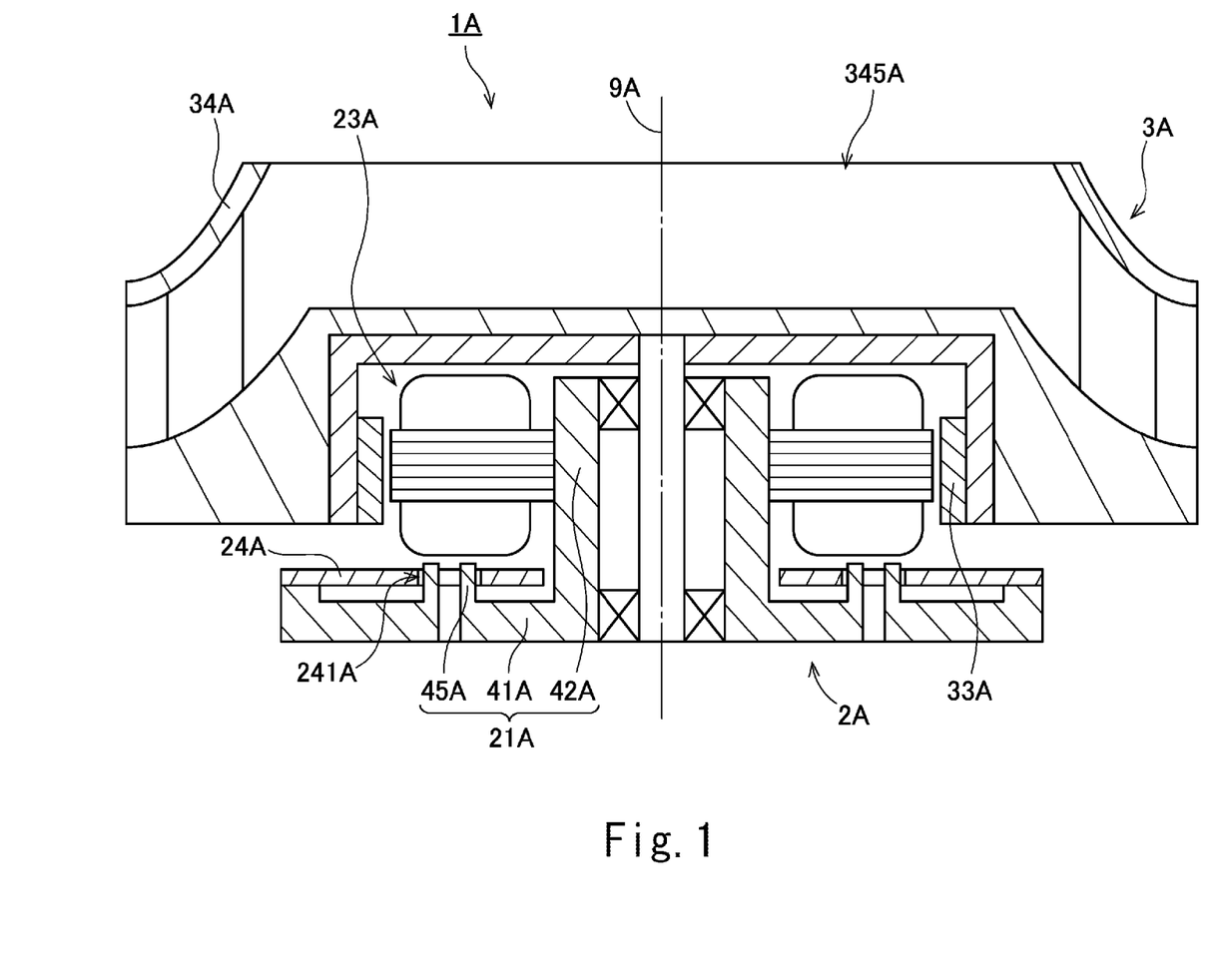
FIG. 1 is a vertical cross-sectional view of a fan motor according to a preferred embodiment of the present invention.

FIG. 1 is a vertical cross-sectional view of a fan motor 1A according to a preferred embodiment of the present invention. Referring to FIG. 1, the fan motor 1A includes a stationary portion 2A and a rotating portion 3A. The rotating portion 3A is supported to be rotatable with respect to the stationary portion 2A.

The stationary portion 2A preferably includes a base member 21A, an armature 23A, and a circuit board 24A. Both the armature 23A and the circuit board 24A are supported by the base member 21A. The armature 23A is arranged to be coaxial with a central axis 9A. The circuit board 24A is arranged below the armature 23A.

The rotating portion 3A includes a magnet 33A and an impeller 34A. The magnet 33A is arranged radially outside the armature 23A. The impeller 34A is arranged to rotate together with the magnet 33A. In addition, the impeller 34A preferably includes an air inlet 345A defined above the armature 23A.

The base member 21A preferably includes a bottom plate portion 41A, a bearing support portion 42A, and a screw receiving portion 45A. The bottom plate portion 41A is arranged to extend in directions perpendicular or substantially perpendicular to the central axis 9A below the circuit board 24A. The bearing support portion 42A is arranged to extend upward from the bottom plate portion 41A. The bearing support portion 42A is substantially cylindrical. The screw receiving portion 45A is arranged to project upward from the bottom plate portion 41A on a radially outer side of the bearing support portion 42A.

The circuit board 24A preferably includes a hole portion 241A extending therethrough in the axial direction. At least a portion of the screw receiving portion 45A is arranged in the hole portion 241A. Accordingly, a lower surface of the circuit board 24A is arranged at an axial height lower than that of an upper end portion of the screw receiving portion 45A. This makes it possible to lower the axial position of each of the circuit board 24A and the armature 23A while securing a sufficient screwing length of a screw. This leads to securing a large air channel near the air inlet 345A of the impeller 34A.

Figure 2:
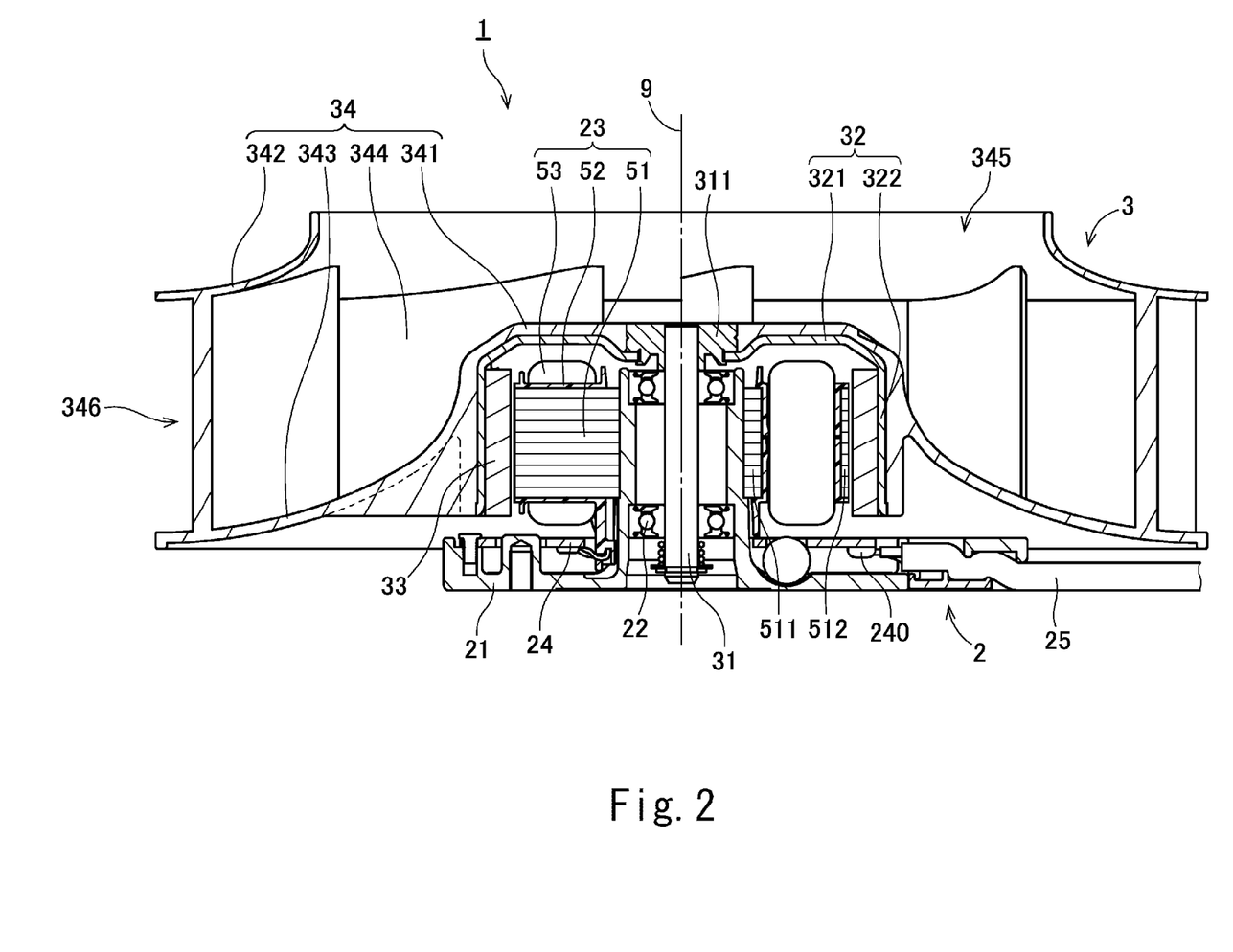
FIG. 2 is a vertical cross-sectional view of a fan motor according to a specific preferred embodiment of the present invention.

The overall structure of a fan motor according to a specific preferred embodiment of the present invention will now be described below. FIG. 2 is a vertical cross-sectional view of a fan motor 1 according to a specific preferred embodiment of the present invention. The fan motor 1 is arranged to generate cooling air currents, and is preferably to be installed in a device, such as, for example, a server, a router, a communication base, a switch device, etc. Note, however, that fan motors according to other preferred embodiments of the present invention may be fan motors arranged to generate air currents for purposes other than cooling. Also note that fan motors according to other preferred embodiments of the present invention may be installed in transportation apparatuses, such as, for example, automobiles, household electrical appliances, office automation appliances, medical appliances, etc.

Referring to FIG. 2, the fan motor 1 includes a stationary portion 2 and a rotating portion 3. The stationary portion 2 is fixed to a frame of a device in which the fan motor is installed. The rotating portion 3 is supported to be rotatable with respect to the stationary portion 2.

Figure 3:
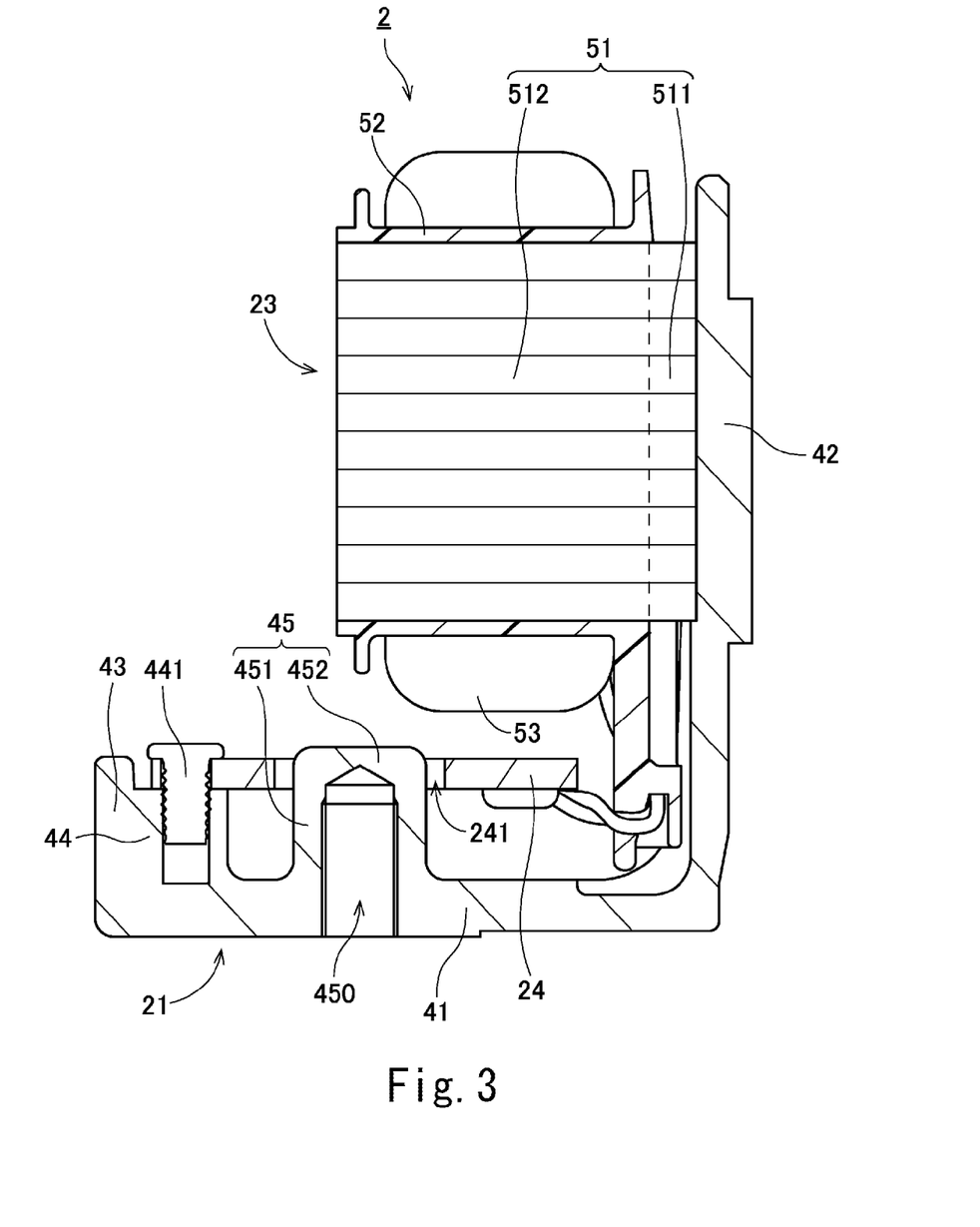
FIG. 3 is a partial vertical cross-sectional view of a stationary portion according to the specific preferred embodiment of the present invention.
Figure 4:
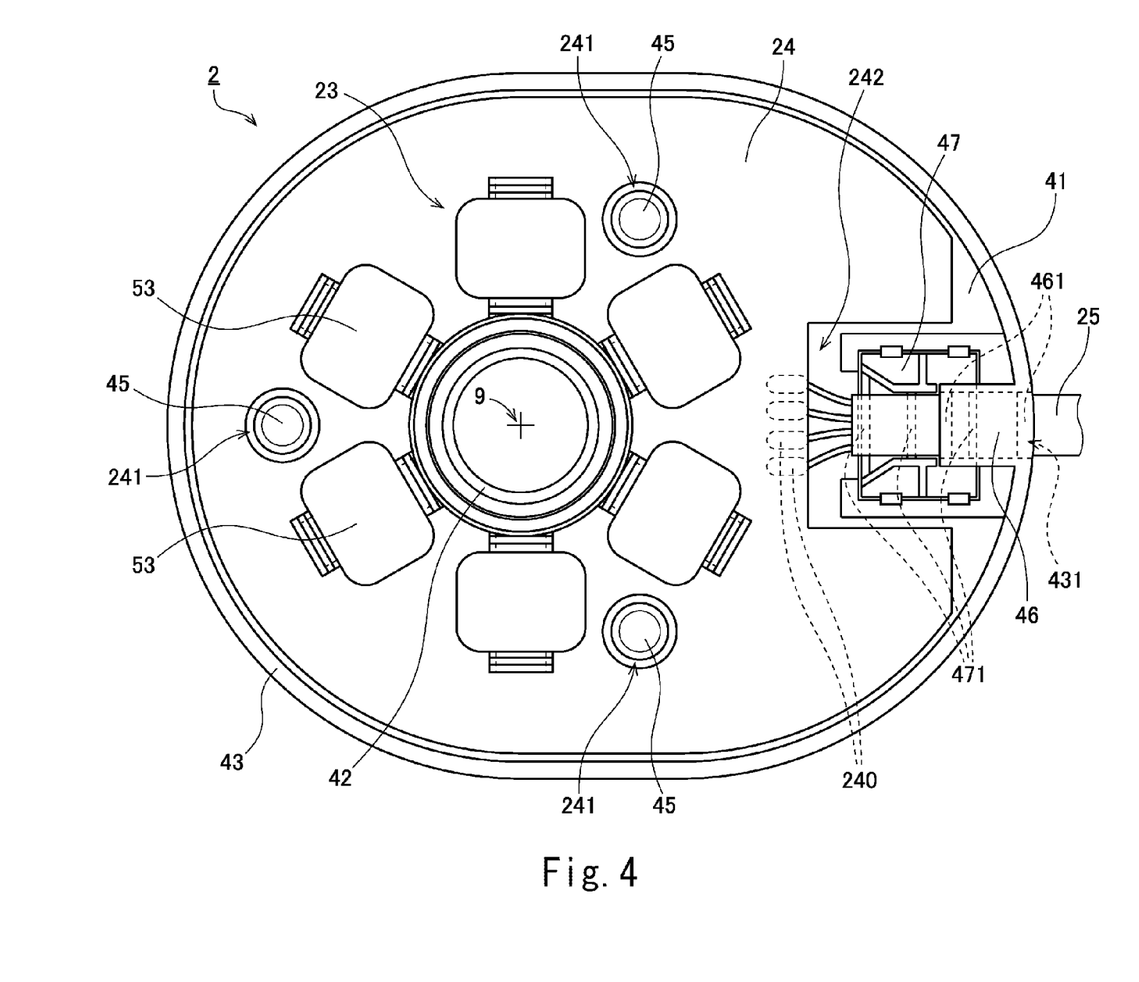
FIG. 4 is a top view of the stationary portion according to the specific preferred embodiment of the present invention.
Figure 5:
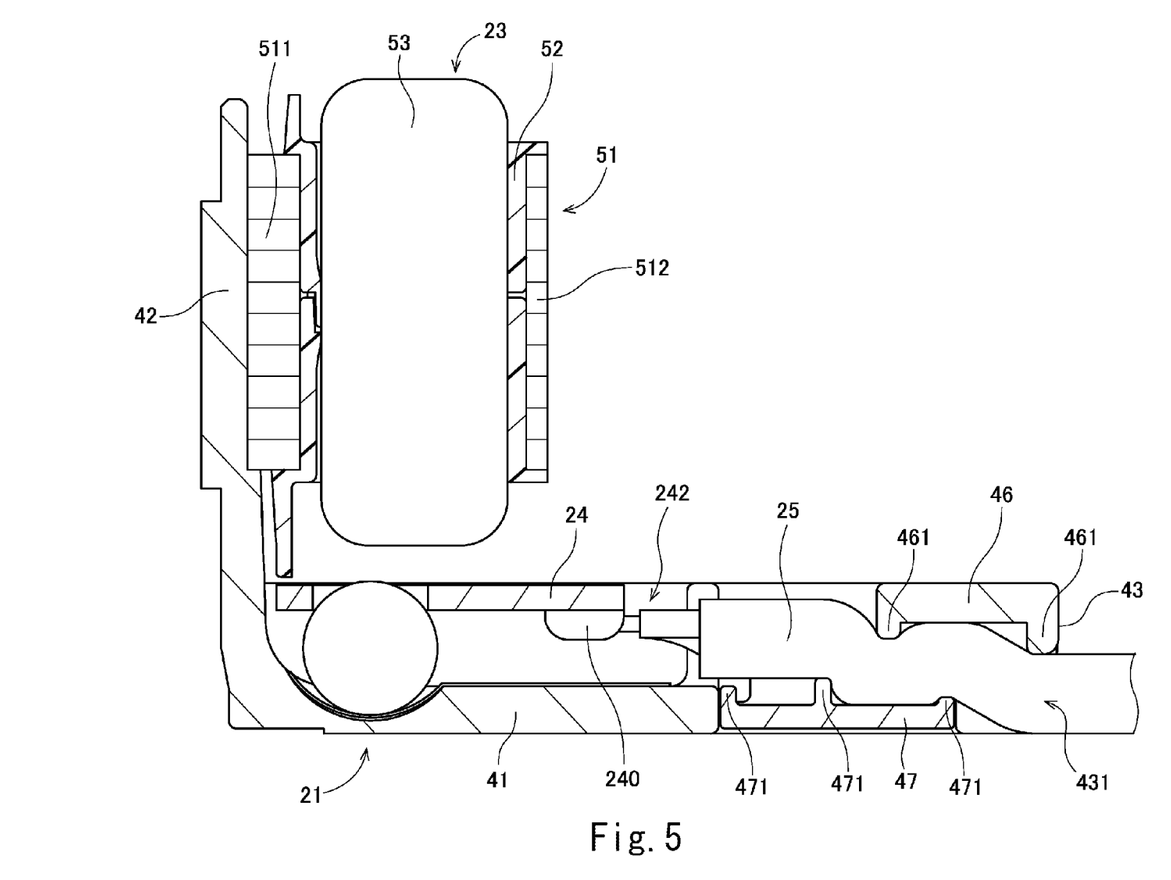
FIG. 5 is a partial vertical cross-sectional view of the stationary portion according to the specific preferred embodiment of the present invention.

The stationary portion 2 according to the present preferred embodiment preferably includes a base member 21, bearing portions 22, an armature 23, and a circuit board 24. FIG. 3 is a partial vertical cross-sectional view of the stationary portion 2. FIG. 4 is a top view of the stationary portion 2. FIG. 5 is a partial vertical cross-sectional view of the stationary portion 2. In the following description, reference will be made to FIGS. 3 to 5 appropriately in addition to FIG. 2.

The base member 21 is arranged to support the bearing portions 22, the armature 23, and the circuit board 24. As a material of the base member 21, either a metal, such as aluminum, or a resin is preferably used, for example. Referring to FIGS. 3 and 5, the base member 21 preferably includes a bottom plate portion 41, a bearing support portion 42, and an outer wall portion 43. The bottom plate portion 41 is arranged to extend in directions perpendicular or substantially perpendicular to a central axis 9 below the circuit board 24. The bottom plate portion 41 preferably is plate-shaped or substantially plate-shaped. The bearing support portion 42 is arranged to extend upward from an inner circumferential portion of the bottom plate portion 41. The bearing support portion 42 preferably is cylindrical or substantially cylindrical. The outer wall portion is arranged to extend upward from an outer circumferential portion of the bottom plate portion 41.

The bearing portions 22 define a mechanism to rotatably support a shaft 31, which is included in the rotating portion 3. A ball bearing, in which an outer race and an inner race are caused to rotate relative to each other through balls, is used as each of the bearing portions 22 according to the present preferred embodiment. The outer race of each bearing portion 22 is fixed to an inner circumferential surface of the bearing support portion 42, while the inner race of each bearing portion 22 is fixed to the shaft 31. Note, however, that a bearing of another type, such as, for example, a plain bearing, a fluid bearing, etc. may be used instead of the ball bearings.

The armature 23 preferably includes a stator core 51, an insulator 52, and coils 53. The stator core 51 is preferably defined by laminated steel sheets, i.e., electromagnetic steel sheets, such as silicon steel sheets, placed one upon another in the axial direction. However, any other desirable type of stator core could be used. The stator core 51 preferably includes a core back 511 and a plurality of teeth 512. The core back 511 is annular, and is arranged to be coaxial with the central axis 9. The teeth 512 are arranged to project radially outward from the core back 511. The core back 511 is fixed to an outer circumferential surface of the bearing support portion 42. The teeth 512 are arranged at regular intervals in a circumferential direction. The teeth 512 are arranged to extend radially with respect to the central axis 9.

The insulator 52 is attached to each of the teeth 512 of the stator core 51. The insulator 52 is preferably made of, for example, an electrically insulating resin. An upper surface, a lower surface, and both circumferential side surfaces of each tooth 512 are preferably covered by the insulator 52. Each coil 53 is defined by an electric wire wound around the insulator 52. That is, in the present preferred embodiment, the electric wire is wound around each tooth 512 with the insulator 52 intervening therebetween. The insulator 52 is arranged to intervene between each tooth 512 and a corresponding one of the coils 53 to provide electrical isolation between the tooth 512 and the coil 53.

An electronic circuit configured to supply drive currents to the coils 53 is mounted on the circuit board 24. The circuit board 24 is arranged below the armature 23 and a plurality of magnets 33. The magnets 33 will be described below. Referring to FIG. 3, the base member 21 preferably includes a plurality of rest portions 44 each of which is arranged to project upward from the bottom plate portion 41 on a radially inner side of the outer wall portion 43. The circuit board 24 is preferably mounted on upper surfaces of the rest portions 44. Moreover, the circuit board 24 is fixed to each rest portion 44 with a fastener such as, for example, a screw 441 inserted into the rest portion 44 from above.

Referring to FIG. 2, the rotating portion 3 according to the present preferred embodiment includes the shaft 31, a rotor holder 32, the magnets 33, and an impeller 34.

The shaft 31 is a columnar member extending in the axial direction. The shaft 31 is preferably made of, for example, a metal such as stainless steel. The shaft 31 is arranged to rotate about the central axis 9 while being supported by the bearing portions 22. An upper end portion of the shaft 31 is arranged to project upward relative to an upper end portion of the bearing support portion 42. An annular bushing 311 is attached to the upper end portion of the shaft 31.

The rotor holder 32 is arranged to rotate together with the shaft 31 while holding the magnets 33. The rotor holder 32 is fixed to the shaft 31 through the bushing 311. Note that the rotor holder 32 may be fixed directly to the shaft 31. The rotor holder 32 preferably includes a cover portion 321 and a cylindrical portion 322. The cover portion 321 is preferably arranged to extend radially outward from the bushing 311 to substantially assume the shape of a plate. The cylindrical portion 322 is arranged to extend downward from an outer circumferential portion of the cover portion 321.

Each of the magnets 33 is preferably fixed to an inner circumferential surface of the cylindrical portion 322. Each magnet 33 is curved substantially in the shape of a circular arc in a plan view. Each magnet 33 is arranged radially outside the armature 23. A radially inner surface of each magnet 33 defines a pole surface which is to be radially opposed to each tooth 512. The magnets 33 are arranged at regular intervals in the circumferential direction such that north and south pole surfaces alternate with each other. Note that, in place of the magnets 33, a single annular magnet in which north and south poles are arranged alternately in the circumferential direction may be used, if so desired.

The impeller 34 is arranged to rotate together with the magnets 33. The impeller 34 preferably includes a central cap portion 341, an upper cover portion 342, a lower cover portion 343, and a plurality of blades 344. The central cap portion 341 preferably is in the shape of a covered cylinder, and is fixed to both the rotor holder 32 and the bushing 311. Referring to FIG. 2, the central cap portion 341 is arranged above the armature 23. An air inlet 345 of the impeller 34 is defined above the central cap portion 341.

The upper cover portion 342 is arranged to extend radially outward and downward from a periphery of the air inlet 345. The lower cover portion 343 is arranged to extend radially outward and downward from the central cap portion 341 below the upper cover portion 342. Each of the blades 344 is arranged to extend in the axial direction between the upper cover portion 342 and the lower cover portion 343. An air outlet 346 of the impeller 34 is defined between an outer circumferential portion of the upper cover portion 342 and an outer circumferential portion of the lower cover portion 343.

Referring to FIG. 2, in the present preferred embodiment, an upper end portion of the lower cover portion 343 is arranged at an axial height lower than that of a lower end portion of the upper cover portion 342. An air channel near the air inlet 345 of the impeller 34 is thereby enlarged. In addition, an upper end portion of each of the blades 344 is arranged at an axial height higher than that of an upper surface of the central cap portion 341. That is, at least a portion of each blade 344 is arranged in the enlarged air channel near the air inlet 345. This enables an air suctioned in through the air inlet 345 to be efficiently pushed toward the air outlet 346 by the blades 344. This results in an improvement in a static pressure and an air volume characteristic. Moreover, if a lower end portion of each blade 344 is arranged at an axial height lower than that of an upper surface of the circuit board 24, the air suctioned in through the air inlet 345 is more efficiently pushed toward the air outlet 346. This results in a further improvement in the static pressure and the air volume characteristic.

Regarding the fan motor 1 described above, once the drive currents are supplied to the coils 53 of the armature 23, radial magnetic flux is generated around each of the teeth 512 of the stator core 51, and a circumferential torque is produced by interaction between the magnetic flux of the teeth 512 and that of the magnets 33, so that the rotating portion 3 is caused to rotate about the central axis 9 with respect to the stationary portion 2. Once the rotating portion 3 is caused to rotate, an air current is generated by the blades 344 of the impeller 34. Specifically, a gas arranged above the impeller 34 is drawn into a space between the upper cover portion 342 and the lower cover portion 343 through the air inlet 345, and is then discharged radially outward through the air outlet 346.

Referring to FIGS. 3 and 4, the base member 21 preferably includes three screw receiving portions 45. Each screw receiving portion 45 is arranged to project upward from the bottom plate portion 41 on a radially outer side of the bearing support portion 42 and on the radially inner side of the outer wall portion 43. In addition, the base member 21 preferably includes screw holes 450 each of which is recessed from a lower surface of the bottom plate portion 41 into a separate one of the screw receiving portions 45. When the fan motor 1 is attached to the device, the base member 21 is screwed to the frame of the device. At this time, a screw is inserted into each screw hole 450 from below the lower surface of the bottom plate portion 41.

Referring to FIG. 3, each screw receiving portion 45 preferably includes a cylindrical portion 451 and an end wall portion 452. The cylindrical portion 451 is arranged to project upward from the bottom plate portion 41. The cylindrical portion 451 preferably is cylindrical or substantially cylindrical. An inside surface of the cylindrical portion 451 preferably includes a spiral screw groove defined therein. The end wall portion 452 is arranged to close an upper end portion of the cylindrical portion 451.

Meanwhile, the circuit board 24 preferably includes three hole portions 241. Each of the three hole portions 241 extends through the circuit board 24 in the axial direction. Referring to FIG. 4, the three screw receiving portions 45 and the three hole portions 241 are arranged to coincide with each other in a plan view. Each screw receiving portion 45 is arranged to project above the upper surface of the circuit board through a corresponding one of the hole portions 241. A portion of the screw receiving portion 45 is therefore arranged in the hole portion 241.

In the present preferred embodiment, the upper surface of the circuit board 24 is arranged at an axial height lower than that of an upper end portion of each screw receiving portion 45. This contributes to reducing the height of the circuit board 24 with reference to the base member 21. A lowered axial position of the circuit board 24 leads to a lowered axial position of the armature 23. This in turn leads to securing a larger air channel near the air inlet 345 of the impeller 34.

Note that the upper end portion of each screw receiving portion 45 may not necessarily project above the upper surface of the circuit board 24. For example, the upper end portion of each screw receiving portion 45 may be arranged at an axial height higher than that of a lower surface of the circuit board 24 and lower than that of the upper surface of the circuit board 24. That is, it is enough that at least a portion of each screw receiving portion 45 should be arranged in the corresponding hole portion 241 of the circuit board 24.

Furthermore, referring to FIG. 4, in the present preferred embodiment, each screw receiving portion 45 is arranged below a gap defined between adjacent ones of the coils 53. Therefore, in the present preferred embodiment, each screw receiving portion 45 does not overlap with a lower end portion of any coil 53 in a plan view. This enables the upper end portion of each screw receiving portion 45 to project above the upper surface of the circuit board 24 while preventing a contact between the screw receiving portion 45 and any coil 53. This makes it possible to increase the number of turns of each coil 53.

Each screw receiving portion 45 according to the present preferred embodiment includes the end wall portion 452. The end wall portion 452 increases the rigidity of the screw receiving portion 45. In addition, there is preferably no possibility that the screw inserted into the screw hole 450 will protrude above the end wall portion 452. This contributes to preventing damage from occurring as a result of the armature 23 or any magnet 33 being brought into proximity to the upper end portion of the screw receiving portion 45. This makes it possible to further lower the axial position of the armature 23 or each magnet 33. This in turn makes it possible to further enlarge the air channel near the air inlet 345 of the impeller 34.

Referring to FIGS. 4 and 5, a lead wire 25 is connected to the circuit board 24 to exchange electrical signals between the circuit board 24 and an external device. The lead wire 25 is fixed to the lower surface of the circuit board 24. In the present preferred embodiment, an end portion of the lead wire 25 is fixed to fixing portions 240 arranged on the lower surface of the circuit board 24 through solder. The lead wire 25 is arranged to extend radially outward from the fixing portions 240 along the lower surface of the circuit board 24.

The outer wall portion 43 of the base member 21 preferably includes an outlet 431 defined therein. The outlet 431 extends through the outer wall portion 43 in a radial direction. The lead wire 25 is drawn substantially horizontally and radially outward out of the outer wall portion 43 through the outlet 431.

That is, in the present preferred embodiment, the lead wire 25 is arranged to extend without rising in the axial direction between the bottom plate portion 41 and the circuit board 24. This makes it possible to reduce the axial dimension of a space between an upper surface of the bottom plate portion 41 and the lower surface of the circuit board 24. This in turn contributes to lowering the axial position of each of the circuit board 24 and the armature 23 with reference to the bottom plate portion 41. This in turn contributes to enlarging the air channel near the air inlet 345 of the impeller 34.

According to the present preferred embodiment, stresses do not tend to act on the lead wire 25 or the solder as compared with a case where the lead wire is arranged to extend axially downward from the lower surface of the circuit board and be then turned to extend in a horizontal direction. It is therefore preferably possible to prevent damage or breaking of the lead wire 25 without a need to reinforce the lead wire 25 by a separate method.

Referring to FIG. 4, each of the base member 21 and the circuit board 24 according to the present preferred embodiment is preferably elliptical or substantially elliptical in a plan view. The central axis 9 of the fan motor 1, the fixing portions 240, and the outlet 431 are arranged on the same straight line extending in a longitudinal direction of the ellipse. The lead wire 25 is arranged to extend along the longitudinal direction of the ellipse. In addition, the outlet 431 and the central axis 9 of the fan motor 1 are arranged on opposite sides of a straight line which joins both end portions of the ellipse on a minor axis thereof. That is, in the present preferred embodiment, the lead wire 25 is arranged to extend radially outward through one of both longitudinal end portions of the ellipse which is more distant from the central axis 9 than the other.

The lead wire 25 is not fixed to the base member 21 or the circuit board 24 radially outside the outer wall portion 43. The lead wire 25 therefore tends to bend easily. In the present preferred embodiment, however, the outlet 431 is distanced from the central axis 9 as described above. Accordingly, a portion of the lead wire 25 which tends to easily bend is also distanced from the central axis 9. Therefore, a bend of the lead wire 25 radially outside the outer wall portion 43 would not easily cause a contact between the lead wire 25 and the impeller 34. Thus, the probability of damage or breaking of the lead wire 25 is preferably further reduced. In the present preferred embodiment, the lead wire 25 is arranged to extend radially outward through the one of both longitudinal end portions of the ellipse which is more distant from the central axis 9 than the other. Note, however, that the lead wire 25 may not necessarily pass through the one of both longitudinal end portions of the ellipse which is more distant from the central axis 9 than the other. The above beneficial effect can be obtained as long as the lead wire 25 is arranged to pass through or in the vicinity of that longitudinal end portion of the ellipse.

Moreover, referring to FIGS. 4 and 5, the circuit board 24 according to the present preferred embodiment preferably includes a cut-out 242 defined therein. The cut-out 242 is recessed radially inward from an edge portion of the circuit board 24 near the outlet 431. In addition, referring to FIG. 5, a portion of the lead wire 25 is accommodated in the cut-out 242 in the present preferred embodiment. That is, the lower surface of the circuit board 24 is arranged at an axial height lower than that of an upper-side surface of the lead wire 25. This arrangement makes it possible to lower the axial position of each of the circuit board 24 and the armature 23 with reference to the bottom plate portion 41. This in turn makes it possible to further enlarge the air channel near the air inlet 345 of the impeller 34.

The cut-out 242 is arranged at one of both longitudinal end portions of the circuit board 24 which is more distant from the central axis 9 than the other. This contributes to securing a large space permitting arrangement of electronic components radially inside the cut-out 242 while the cut-out 242 is defined. This moreover makes it possible to make the slope of an end portion of the lead wire 25 which extends from the fixing portions 240 to the outlet 431 gentler. This reduces the likelihood that stresses will act on the lead wire 25, and thereby reduces the likelihood of damage or breaking of the lead wire 25.

In addition, referring to FIGS. 4 and 5, the base member 21 preferably further includes an upper hold-down portion 46 arranged to be in contact with the upper-side surface of the lead wire 25. The upper hold-down portion 46 is arranged to extend radially inward from an upper side of the outlet 431 of the outer wall portion 43. In addition, the upper hold-down portion 46 preferably includes two first projections 461 each of which is arranged to project downward. A lower end portion of at least one of the first projections 461 is arranged to be in contact with the upper-side surface of the lead wire 25.

Moreover, the fan motor 1 according to the present preferred embodiment preferably includes a lower hold-down member 47 fixed to the base member 21. The lower hold-down member 47 is fixed to the base member 21 from below on a radially inner side of the outlet 431. In addition, the lower hold-down member 47 preferably includes three second projections 471 each of which is arranged to project upward. An upper end portion of at least one of the second projections 471 is arranged to be in contact with a lower-side surface of the lead wire 25.

As described above, the lead wire 25 is fixed by being held by the two first projections 461 and the three second projections 471 from both sides. This contributes to preventing the lead wire 25 from vibrating or shaking. This in turn contributes to more securely preventing damage or breaking of the lead wire 25. Note that a portion of the upper hold-down portion 46 is preferably arranged radially outward of the lower hold-down member 47. That is, a radially outer one of the two first projections 461 is preferably arranged radially outward of a radially outermost one of the three second projections 471. This arrangement contributes to more securely preventing contact between the lead wire 25 and the impeller 34. This in turn contributes to more securely preventing damage or breaking of the lead wire 25.

In particular, in the present preferred embodiment, the number of first projections 461 and the number of second projections 471 preferably are both more than one. Moreover, the first projections 461 and the second projections 471 are arranged alternately in the radial direction. The lead wire 25 is fixed more securely by this arrangement. Note that only some of the first projections 461 and some of the second projections 471 may be arranged alternately in the radial direction. Also note that each of the number of first projections 461 and the number of second projections 471 may be one.

While preferred embodiments of the present invention have been described above, it is to be understood that the present invention is not limited to the above-described preferred embodiments.

For example, the number of screw receiving portions may be three as in the above-described second preferred embodiment, but may also be one, two, or more than three. Also, the outside shape of the screw receiving portion in a plan view is not limited to a circular or substantially circular shape, but may be another shape such as, for example, a quadrilateral or substantially quadrilateral shape or the like. Also, the screw receiving portion may be defined by only the cylindrical portion without including the end wall portion. Also, the shape of each of the base member and the circuit board in a plan view may be an elliptical or a substantially elliptical shape as in the above-described second preferred embodiment, but may also be another shape such as, for example, circular or substantially circular, a quadrilateral or substantially quadrilateral shape, etc.

Also, in place of the upper hold-down portion, an upper hold-down member separate from the base member and fixed to the base member may be provided. In this case, the upper hold-down member may include the first projection(s). Also, in place of the lower hold-down member, a lower hold-down portion including the second projection(s) and included in the base member may be provided. In short, it is enough that the first projection(s) and the second projection(s) should be included in the base member or members fixed to the base member.

Note that the detailed shape of the fan motor may be different from that illustrated in the accompanying drawings of the present application. Also note that features of the above-described preferred embodiments and the modifications thereof may be combined appropriately as long as no conflict arises.

Preferred embodiments of the present invention are applicable to a fan motor, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fan motor comprising:
    a stationary portion; and
    a rotating portion supported to be rotatable with respect to the stationary portion; wherein
    the stationary portion includes:
        an armature that is coaxial with a central axis extending in a vertical direction;
        a circuit board positioned below the armature; and
        a base member that supports the armature and the circuit board;
    the rotating portion includes:
        a magnet positioned radially outside the armature; and
        an impeller that rotates together with the magnet;
    the base member includes:
        a bottom plate portion that extends in directions perpendicular or substantially perpendicular to the central axis below the circuit board;
        a cylindrical bearing support portion that extends upward from the bottom plate portion; and
        a screw receiving portion that projects upward from the bottom plate portion on a radially outer side of the bearing support portion;
    the impeller includes an air inlet located above the armature;
    the circuit board includes a hole portion extending therethrough in an axial direction;
    at least a portion of the screw receiving portion is located in the hole portion with a circumferential gap extending around an entirety of the circuit board hole portion between the screw receiving portion and the circuit board,
    the fan motor further includes a lead wire fixed to a lower surface of the circuit board,
    the circuit board includes a fixing portion to which the lead wire is fixed,
    the lead wire extends radially outward from the fixing portion along the lower surface of the circuit board, and
    the base member includes:
        an outer wall portion that extends upward from an outer circumferential portion of the bottom plate portion; and
        an outlet that extends through the outer wall portion in a radial direction; and
    the lead wire extends radially outward out of the outer wall portion through the outlet.

2. The fan motor according to claim 1, wherein an upper surface of the circuit board is located at an axial height lower than that of an upper end portion of the screw receiving portion.

3. The fan motor according to claim 1, wherein the armature includes:
    a plurality of teeth that extend radially with the central axis as a center; and
    coils, each of which is defined by an electric wire wound around a separate one of the teeth; and
    the screw receiving portion is located below a gap located between adjacent ones of the coils.

4. The fan motor according to claim 3, wherein the screw receiving portion includes:
    a cylindrical portion that projects upward from the bottom plate portion; and
    an end wall portion that closes an upper end portion of the cylindrical portion.

5. The fan motor according to claim 1, wherein
    the circuit board is elliptical or substantially elliptical in a plan view; and
    the lead wire extends radially outward through one of both longitudinal end portions of the circuit board which is more distant from the central axis than the other.

6. The fan motor according to claim 1, wherein
    the circuit board includes a cut-out recessed radially inward from an edge portion thereof; and
    a portion of the lead wire is accommodated in the cut-out.

7. The fan motor according to claim 1, further comprising a lower hold-down member fixed to the base member and located on a radially inner side of the outlet; wherein
    the base member includes an upper hold-down portion that extends radially inward from an upper side of the outlet;
    the upper hold-down portion includes one or more first projections which are in contact with an upper-side surface of the lead wire; and
    the lower hold-down member includes one or more second projections which are in contact with a lower-side surface of the lead wire.

8. The fan motor according to claim 7, wherein
    the number of first projections included in the upper hold-down portion is more than one;
    the number of second projections included in the lower hold-down member is more than one; and
    some of the first projections and some of the second projections are positioned alternately in the radial direction.

9. The fan motor according to claim 1, further comprising an upper hold-down member fixed to the base member and extending radially inward from an upper side of the outlet; wherein
- the base member further includes a lower hold-down portion that extends radially inward on a radially inner side of the outlet;
- the upper hold-down member includes one or more first projections that are in contact with an upper-side surface of the lead wire; and
- the lower hold-down portion includes one or more second projections that are in contact with a lower-side surface of the lead wire.

10. The fan motor according to claim 9, wherein
- the number of first projections included in the upper hold-down member is more than one;
- the number of second projections included in the lower hold-down portion is more than one; and
- some of the first projections and some of the second projections are positioned alternately in the radial direction.

11. The fan motor according to claim 1, wherein
the impeller includes:
- an upper cover portion that extends radially outward and downward from a periphery of the air inlet; and
- a lower cover portion that extends radially outward and downward below the upper cover portion; and
- an upper end portion of the lower cover portion is located at an axial height lower than that of a lower end portion of the upper cover portion.

\* \* \* \* \*